United States Patent
Anker et al.

(10) Patent No.: US 10,233,310 B2
(45) Date of Patent: Mar. 19, 2019

(54) POLYMER COMPOSITION COMPRISING A CROSSLINKABLE POLYOLEFIN WITH HYDROLYSABLE SILANE GROUPS, CATALYST AND A SURFACTANT INTERACTING ADDITIVE

(71) Applicants: BOREALIS AG, Vienna (AT); Fiona Fagrell, Luleå (SE)

(72) Inventors: Martin Anker, Hisings Karra (SE); Perry Nylander, Gothenburg (SE); Roger Carlsson, Save (SE); Bernt-Ake Sultan, Stenungsund (SE); Stefan Hellstrom, Kungalv (SE); Kristian Dahlen, Stora Hoga (SE); Ola Fagrell, Stenungsund (SE)

(73) Assignee: BOREALIS AG, Vienna (AT)

(*) Notice: Subject to any disclaimer, the term of this patent is extended or adjusted under 35 U.S.C. 154(b) by 275 days.

(21) Appl. No.: 15/105,506

(22) PCT Filed: Dec. 14, 2014

(86) PCT No.: PCT/EP2014/078321
§ 371 (c)(1),
(2) Date: Jun. 16, 2016

(87) PCT Pub. No.: WO2015/091702
PCT Pub. Date: Jun. 25, 2015

(65) Prior Publication Data
US 2016/0312012 A1 Oct. 27, 2016
US 2017/0107356 A2 Apr. 20, 2017

(30) Foreign Application Priority Data

Dec. 18, 2013 (EP) .................................... 13197979

(51) Int. Cl.
| | |
|---|---|
| C08K 13/02 | (2006.01) |
| C08K 3/013 | (2018.01) |
| C08K 3/20 | (2006.01) |
| C08K 3/26 | (2006.01) |
| C08K 5/00 | (2006.01) |
| C08L 23/08 | (2006.01) |
| C08L 43/04 | (2006.01) |
| H01B 3/44 | (2006.01) |

(52) U.S. Cl.
CPC ............. *C08K 13/02* (2013.01); *C08K 3/013* (2018.01); *C08K 3/20* (2013.01); *C08K 3/26* (2013.01); *C08K 5/005* (2013.01); *C08L 23/0853* (2013.01); *C08L 23/0869* (2013.01); *C08L 23/0892* (2013.01); *C08L 43/04* (2013.01); *H01B 3/441* (2013.01); *C08L 2203/18* (2013.01)

(58) Field of Classification Search
CPC .......... C08K 13/02; C08K 3/013; C08K 3/20; C08K 3/26; C08K 5/005; C08L 23/0853; C08L 23/0869; C08L 23/0892; C08L 43/04; C08L 2203/18; H01B 3/441
USPC ........................................................ 524/427
See application file for complete search history.

(56) References Cited

U.S. PATENT DOCUMENTS

| | | | |
|---|---|---|---|
| 3,646,155 | A | 2/1972 | Scott |
| 4,117,195 | A | 9/1978 | Swarbrick et al. |
| 4,297,310 | A | 10/1981 | Akutsu et al. |
| 4,351,876 | A | 9/1982 | Doi et al. |
| 4,397,981 | A | 8/1983 | Doi et al. |
| 4,413,066 | A | 11/1983 | Isaka et al. |
| 4,446,283 | A | 5/1984 | Doi et al. |
| 4,456,704 | A | 6/1984 | Fukumura et al. |
| 6,774,170 | B2 * | 8/2004 | Webster .................. C08K 3/04 252/400.23 |

(Continued)

FOREIGN PATENT DOCUMENTS

| | | |
|---|---|---|
| EP | 0736065 B1 | 2/2000 |
| EP | 1309631 B1 | 4/2005 |

(Continued)

OTHER PUBLICATIONS

International Search Report of International Application No. PCT/EP2014/078321 dated Jan. 28, 2015.

(Continued)

*Primary Examiner* — Ling Siu Choi
*Assistant Examiner* — Ronald Grinsted
(74) *Attorney, Agent, or Firm* — Roberts Mlotkowski Safran Cole & Calderon, P.C.

(57) ABSTRACT

The present invention relates to a polymer composition comprising a surfactant interacting additive, and wherein the polymer composition further comprises at least one silanol condensation catalyst, wherein each catalyst is selected from: i) a compound of formula I ArSO$_3$H (I) or a precursor thereof, wherein Ar is an 1 to 4 alkyl groups substituted aryl, wherein the aryl is phenyl or naphthyl, and wherein each alkyl group, independently, is a linear or branched alkyl with 10 to 30 carbons, wherein the total number of carbons in the alkyl groups is in the range of 20 to 80 carbons; ii) a derivative of i) selected from the group consisting of an anhydride, an ester, an acetylate, an epoxy blocked ester and an amine salt thereof which is hydrolysable to the corresponding compound of formula I; and iii) a metal salt of i) wherein the metal ion is selected from the group consisting of copper, aluminum, tin and zinc; an article, for example, a coating, a wire or a cable, comprising the polymer composition, a process for producing an article and use of the polymer composition.

15 Claims, No Drawings

(56) References Cited

U.S. PATENT DOCUMENTS

2008/0176981 A1\* 7/2008 Biscoglio .............. C08F 255/00
                                                                            524/284

FOREIGN PATENT DOCUMENTS

| EP | 1309632 B1 | 4/2005 |
|----|------------|--------|
| EP | 1254923 B1 | 8/2006 |
| EP | 1916673 A1 | 4/2008 |
| EP | 1849816 B1 | 6/2008 |
| EP | 2657284 A1 | 10/2013 |
| WO | 9517463 A1 | 6/1995 |
| WO | 0212354 A1 | 2/2002 |
| WO | 2005003199 A1 | 1/2005 |

OTHER PUBLICATIONS

Written Opinion of International Application No. PCT/EP2014/078321 dated Jan. 28, 2015.

\* cited by examiner

POLYMER COMPOSITION COMPRISING A CROSSLINKABLE POLYOLEFIN WITH HYDROLYSABLE SILANE GROUPS, CATALYST AND A SURFACTANT INTERACTING ADDITIVE

FIELD OF INVENTION

The present invention relates to a new polymer composition, an article, for example, a coating, a wire or a cable, comprising the polymer composition, a process for producing an article and use of the polymer composition.

BACKGROUND

It is known to crosslink polymers by means of additives. Crosslinking improves properties of the polymer such as mechanical strength and heat resistance. Polymers normally considered to be thermoplastics, and not crosslinkable, can also be made crosslinkable by introducing crosslinkable groups in the polymer. Examples thereof are polymer compositions comprising polyolefins, such as polyethylenes, where silane compounds have been introduced as crosslinkable groups, e.g. by grafting silane compounds onto a prepared polyolefin, or by copolymerisation of an olefin and a silane compound. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

The crosslinking of polymer compositions comprising hydrolysable silane groups with catalysts is known in the art, see e.g. EP0736065. It is further known that the crosslinking process may advantageously be carried out in the presence of acidic silanol condensation catalysts. The acidic silanol condensation catalysts permit crosslinking of silane-containing polymer compositions already at room temperature (about 20 to 25° C.). Examples of such acidic silanol condensation catalysts which are organic sulphonic acids, or precursors of such acids, are disclosed in, for example, WO95/17463, EP1309631, EP1309632 and EP1849816, which documents, and the contents therein, are enclosed herein by reference.

It is also known to use various additives in polymer compositions. The particular type and amount of the additive to be used is dependent on the particular application a polymer composition is designed for.

Further, some important groups of additives are surfactant interacting additives which may be represented by, for example, pigments, and important pigments are pigments which comprise titanium dioxide, i.e. $TiO_2$, and/or calcium carbonate, i.e. $CaCO_3$, as the main component. The pigments which comprise titanium dioxide, and/or calcium carbonate, are used to improve colour coverage of processed articles. The pigments, comprising titanium dioxide, and/or calcium carbonate, are, e.g., used to make processed articles more opaque.

Furthermore, uses of pigments comprising titanium dioxide, and/or calcium carbonate, in polymer compositions comprising polyolefins with hydrolysable silane groups and conventional silanol condensation catalysts are also known in the art. Moreover, it has further been shown that surfactant interacting additives, such as pigments comprising titanium dioxide, and/or calcium carbonate, are to some extent deactivating the crosslinking ability of silanol condensation catalysts of the Brönstedt acid type. Therefore, generally speaking, pigments comprising titanium dioxide, and/or calcium carbonate, are not compatible with the technology of crosslinking polyolefins containing hydrolysable silane groups with the silanol condensation catalysts of the Brönstedt acid type. Thus, there is a need of polymer compositions comprising a specific silanol condensation catalyst and a surfactant interacting additive, for example pigments comprising titanium dioxide, and/or calcium carbonate, wherein the polymer compositions effectively promote the crosslinking performance of the silanol condensation catalysts of the Brönstedt acid type.

DESCRIPTION OF THE INVENTION

It has now surprisingly been found that the object to provide a polymer composition which effectively promotes the desired crosslinking performance is achieved by a new polymer composition in accordance to the present invention, wherein the polymer composition comprises a surfactant interacting additive, and a specific silanol condensation catalyst of the Brönstedt acid type, wherein the catalyst is:
i) a compound of formula I

$$ArSO_3H \qquad (I)$$

or a precursor thereof, wherein
Ar is an 1 to 4 alkyl groups substituted aryl, wherein the aryl is phenyl or naphthyl, and wherein each alkyl group, independently, is a linear or branched alkyl with 10 to 30 carbons, wherein the total number of carbons in the alkyl groups is in the range of 20 to 80 carbons;
ii) a derivative of i) selected from the group consisting of an anhydride, an ester, an acetylate, an epoxy blocked ester and an amine salt thereof which is hydrolysable to the corresponding compound of formula I; and
iii) a metal salt of i) wherein the metal ion is selected from the group consisting of copper, aluminum, tin and zinc.

Thus, the present invention provides a polymer composition comprising a surfactant interacting additive, wherein the polymer composition further comprises at least one silanol condensation catalyst, and each catalyst is selected from:
i) a compound of formula I

$$ArSO_3H \qquad (I)$$

or a precursor thereof, wherein
Ar is an 1 to 4 alkyl groups substituted aryl, wherein the aryl is phenyl or naphthyl, and wherein each alkyl group, independently, is a linear or branched alkyl with 10 to 30 carbons, wherein the total number of carbons in the alkyl groups is in the range of 20 to 80 carbons;
ii) a derivative of i) selected from the group consisting of an anhydride, an ester, an acetylate, an epoxy blocked ester and an amine salt thereof which is hydrolysable to the corresponding compound of formula I; and
iii) a metal salt of i) wherein the metal ion is selected from the group consisting of copper, aluminum, tin and zinc.

In accordance with the present invention, by using the polymer composition as described herein comprising a surfactant interacting additive, and a specific silanol condensation catalyst of the Brönstedt acid type, (which catalyst comprises an aryl substituted with one or more alkyl groups), it has surprisingly now been possible to achieve an efficient crosslinking reaction, i.e. hydrolysis and condensation of silane groups, in presence of a surfactant interacting additive. This is especially significant when polymer article is crosslinked in hot water bath. The surfactant interacting additive may for instance be a colour masterbatch. Colour masterbatches comprising titanium dioxide and/or calcium carbonate will usually interact with the Brönstedt acid. If the presence of titanium dioxide and/or calcium carbonate is significantly high relative to the catalyst concentration, the result will be inefficient crosslinking of silane groups. Thus, the present invention relates to the use of a specific silanol condensation catalyst of the Brönstedt acid type having a lipophilic nature. Consequently, the catalyst has shown to have an improved compatibility with the, usually non-polar, polymer matrix of a polymer composition. Thus, accordingly, the catalyst also has less driving force to lower its energy by interacting with an additive surface. Hence, the catalyst stays longer times in the polymer matrix and is more available for catalysis of silane hydrolysation and condensation reactions.

The polymer composition according to the present invention comprises the surfactant interacting additive which surfactant interacting additive may comprise solid substances with polar surface groups, for example, one or more selected from fillers, different kind of pigments, $TiO_2$, $CaCO_3$, carbon black (e.g. "UV black", i.e. a carbon black that absorbs ultraviolet radiation), huntite, mica, kaolin, aluminium hydroxide (ATH), magnesium dihydroxide (MDH), and $SiO_2$.

Further, in accordance with the present invention the expression "a polymer composition comprises a surfactant interacting additive, wherein the polymer composition further comprises at least one silanol condensation catalyst" shall also be understood to include embodiments of a polymer composition where a surfactant interacting additive is comprised in a skin, which skin is outside, and in contact with, an inner polymer composition comprising said "at least one" silanol condensation catalyst. Thus, in such embodiments the polymer composition of the present invention comprises said skin, comprising a surfactant interacting additive, as well as said inner polymer composition comprising said "at least one" silanol condensation catalyst. Further, said inner polymer composition may, optionally, also comprise a surfactant interacting additive.

Furthermore, in accordance with the present invention the expression "a polymer composition comprises a surfactant interacting additive, wherein the polymer composition further comprises at least one silanol condensation catalyst" shall also be understood to include embodiments of a polymer composition comprising a surfactant interacting additive, wherein the polymer composition has been sprayed with the at least one silanol condensation catalyst.

The polymer composition of the present invention do also comprise the "at least one" silanol condensation catalyst, wherein each catalyst is selected from:

i) a compound of formula I

$$ArSO_3H \qquad (I)$$

or a precursor thereof, wherein
Ar is an 1 to 4 alkyl groups substituted aryl, wherein the aryl is phenyl or naphthyl, and wherein each alkyl group, independently, is a linear or branched alkyl with 10 to 30 carbons, wherein the total number of carbons in the alkyl groups is in the range of 20 to 80 carbons;
ii) a derivative of i) selected from the group consisting of an anhydride, an ester, an acetylate, an epoxy blocked ester and an amine salt thereof which is hydrolysable to the corresponding compound of formula I; and
iii) a metal salt of i) wherein the metal ion is selected from the group consisting of copper, aluminum, tin and zinc.

Ar of the compound of formula I, may, besides the "1 to 4 alkyl groups"-substituents, also, optionally, comprise further suitable substituents.

An embodiment of the present invention provides a polymer composition, as described herein, wherein said each silanol condensation catalyst is selected from a) $C_{12}$-alkylated naphthyl sulfonic acids;

b) a derivative of a) selected from the group consisting of an anhydride, an ester, an acetylate, an epoxy blocked ester and an amine salt thereof which is hydrolysable to the corresponding compound a); and/or c) a metal salt of a) wherein the metal ion is selected from the group consisting of copper, aluminum, tin and zinc.

A further embodiment of the present invention provides a polymer composition, as described herein, wherein said each silanol condensation catalyst is selected from $C_{12}$-alkylated naphthyl sulfonic acids.

In a further embodiment of the present invention, the polymer composition is a silanol condensation catalyst masterbatch which further comprises a polymer matrix.

When the polymer composition in accordance with the present invention is a silanol condensation catalyst masterbatch, said silanol condensation catalyst masterbatch may be a mixture which may comprise both the surfactant interacting additive and the "at least one" silanol condensation catalyst, i.e. the compound of formula I, both in a concentrated form in said polymer matrix.

Further, when the polymer composition in accordance with the present invention is a silanol condensation catalyst masterbatch, said silanol condensation catalyst masterbatch may be produced by compounding the surfactant interacting additive, the "at least one" silanol condensation catalyst and, optionally, any further additives with a polymer resin (i.e. a carrier resin), whereby the polymer resin forms the polymer matrix.

The further, optional, additives may, for example, be miscible thermoplastics, antioxidants, stabilizers, lubricants, fillers, peroxides, silanes and/or foaming agents.

The silanol condensation catalyst masterbatch in accordance with the present invention may be in a liquid form or a solid form suitably formed into, for example, a powder and/or granular shaped solids, e.g. pellets or granules.

Furthermore, prior to a crosslinking of a polymer, handling of the "at least one" silanol condensation catalyst, i.e. the compound of formula I, and the surfactant interacting additive may be facilitated when added in concentrated form as the silanol condensation catalyst masterbatch.

The polymer matrix may comprise, for example, a polyolefin, e.g., a polyethylene, which may be a homo- or copolymer of ethylene, e.g. low density polyethylene, or a ethylene-acrylate where the acrylate comonomer is selected from methyl acrylate, methyl methacrylate, ethyl acrylate, butyl acrylate, and tert-butyl acrylate, or a copolymer containing 1 to 50 percent by weight of the acrylate comonomer, or any mixtures thereof. Furthermore, the polymer matrix may comprise a high density or medium density polyethylene. Further, the polymer matrix may comprise a bimodal polymer.

In still a further embodiment of the present invention, the polymer composition further comprises a crosslinkable polyolefin with hydrolysable silane groups.

The crosslinkable polyolefin of the polymer composition may, for example, comprise a polyethylene with hydrolysable silane groups, or the crosslinkable polyolefin may, e.g., consist of a polyethylene with hydrolysable silane groups.

The hydrolysable silane groups may be introduced into the polyolefin by copolymerisation of, e.g., ethylene and silane group containing comonomers or by grafting, i.e. by chemical modification of the polyolefin by addition of silane-containing compounds mostly in a radical reaction. Both techniques are well known in the art.

Moreover, the crosslinkable polyolefin with hydrolysable silane groups may be obtained by copolymerisation. In the case of polyolefin being, for example, polyethylene, the copolymerisation may be carried out with an unsaturated silane compound represented by the formula II

wherein
$R^1$ is an ethylenically unsaturated alkyl, alkyloxy or (meth)acryloxy alkyl group,
$R^2$ is an aliphatic saturated alkyl group,
Y which may be the same or different, is a hydrolysable organic group and
q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

In even a further embodiment the unsaturated silane compound may be represented by the formula III

wherein A is a alkyl group having 1 to 8 carbon atoms, e.g. 1 to 4 carbon atoms.

In further embodiments of the present invention the silane compound may be, e.g., vinyl trimethoxysilane, vinyl bismethoxyethoxysilane, vinyl triethoxysilane, gamma-(meth)acryloxypropyltrimethoxysilane, gamma(meth)acryloxypropyltriethoxysilane, or vinyl triacetoxysilane.

Said copolymerisation may be carried out under any suitable conditions resulting in the copolymerisation of two monomers.

Moreover, the copolymerisation may be implemented in the presence of one or more other comonomers which can be copolymerised with the two monomers. Such comonomers include, for example, vinyl carboxylate esters, such as vinyl acetate and vinyl pivalate, alpha-olefins, such as propene, 1-butene, 1-hexane, 1-octene and 4-methyl-1-pentene, (meth)acrylates, such as methyl(meth)acrylate, ethyl(meth)acrylate and butyl(meth)acrylate, olefinically unsaturated carboxylic acids, such as (meth)acrylic acid, maleic acid and fumaric acid, (meth)acrylic acid derivatives, such as (meth)acrylonitrile and (meth)acrylic amide, vinyl ethers, such as vinyl methyl ether and vinyl phenyl ether, and aromatic vinyl compounds, such as styrene and alpha-ethyl styrene.

In still further embodiments of the present invention, said comonomers may be vinyl esters of monocarboxylic acids having 1-4 carbon atoms, such as vinyl acetate, and/or (meth)acrylate of alcohols having 1-4 carbon atoms, such as methyl(meth)-acrylate.

In even further embodiments of the present invention, the comonomers: butyl acrylate, ethyl acrylate and/or methyl acrylate are disclosed.

Two or more comonomers, such as any of the olefinically unsaturated compounds disclosed herein, may be used in combination. The term "(meth)acrylic acid" is intended to embrace both acrylic acid and methacrylic acid. The comonomer content of the copolymer may amount to 70% by weight of the copolymer, for example, about 0.5 to 35% by weight, e.g., about 1 to 30% by weight.

If a graft polymer is used, it may have been produced e.g. by any of the two methods described in U.S. Pat. No. 3,646,155 and U.S. Pat. No. 4,117,195, respectively.

The polyolefin with hydrolysable silane groups, which is comprised in the polymer composition of the present invention, may comprise 0.001 to 15% by weight of silane compound, for example, 0.01 to 5% by weight, e.g., 0.1 to 2% by weight.

In further embodiments of the present invention, Ar of the compound of formula I, is a 1, 2, 3 or 4 alkyl groups substituted aryl, for example, a 2 to 3 alkyl groups substituted aryl, or, e.g., a 2 alkyl groups substituted aryl. Further, said aryl is phenyl or naphthyl, e.g. naphthyl.

In an embodiment of the present invention, Ar is naphthyl being substituted by, e.g. 2 alkyl groups.

Furthermore, each alkyl group, independently, is a linear or branched alkyl with 10 to 30 carbons, wherein the total number of carbons in the alkyl groups is in the range of 20 to 80 carbons.

In a further embodiment of the present invention, each alkyl group, independently, is a linear alkyl with 10 to 15 carbons, wherein the total number of carbons in the alkyl groups is in the range of 20 to 60 carbons.

In still a further embodiment of the present invention, any two of said alkyl groups may be linked to each other via a bridging group such as an alkylene group.

The silanol condensation catalyst may also be a derivative of the compound of formula I as described herein, wherein said derivative may be converted by hydrolysis to the compound of formula I. The derivative may, for example, be a corresponding acid anhydride of the compound of formula I. Alternatively, the derivative may be a compound of formula I which has been provided with a hydrolysable protective group, as, e.g., an acetyl group. The hydrolysable protective group can be removed by hydrolysis.

In an embodiment the polymer composition according to the present invention comprises the surfactant interacting additive in an amount of, for example, 0.01 to 5% by weight, or, e.g., 0.01 to 2% by weight.

In a further embodiment the polymer composition according to the present invention comprises the "at least one" silanol condensation catalyst in an amount of, for example, 0.0001 to 8% by weight, 0.0001 to 6% by weight, 0.001 to 2% by weight, 0.05 to 1% by weight, 1 to 8% by weight or 1 to 6% by weight.

In even a further embodiment wherein the polymer composition is the silanol condensation catalyst masterbatch according to the present invention, the silanol condensation catalyst masterbatch comprises the surfactant interacting additive in an amount of, for example, 0.2 to 40 wt %, or, e.g., 1 to 35 wt %.

In still a further embodiment wherein the polymer composition is the silanol condensation catalyst masterbatch according to the present invention, the silanol condensation catalyst masterbatch comprises the "at least one" silanol condensation catalyst in an amount of, for example, 0.7 to 8% by weight, 0.7 to 6% by, 1 to 8% by weight or 1 to 6% by weight.

The polymer composition according to the invention may further comprise various additives, for example, miscible thermoplastics, antioxidants, stabilizers, lubricants, fillers, peroxides, silanes and/or foaming agents.

As antioxidant, a compound, or a mixture of compounds, may, for example, be used. The antioxidant may, suitably, be neutral or acidic compounds, and which compounds may, suitably, comprise a sterically hindered phenol group or aliphatic sulphur groups. Such compounds are disclosed in EP1254923 and these are suitable antioxidants for stabilisation of polyolefins containing hydrolysable silane groups which are crosslinked with a silanol condensation catalyst, e.g., an acidic silanol condensation catalyst. Other exemplified antioxidants are disclosed in WO2005003199.

Moreover, the antioxidant may be present in the polymer composition in an amount of from 0.01 to 3 wt %, e.g., 0.05 to 2 wt %, or, e.g., 0.08 to 1.5 wt %.

In accordance with the present invention the "at least one" silanol condensation catalyst, the surfactant interacting additive and the crosslinkable polyolefin may suitably be mixed to produce the polymer composition of the present invention, by compounding a crosslinkable polyolefin together with one or more additive masterbatches. The one or more additive masterbatches may suitably include the silanol condensation catalyst masterbatch of the present invention as described herein.

Said compounding may be performed by any known compounding process, including extruding the final product with a screw extruder or a kneader.

Further, the one or more additive masterbatches comprise said "at least one" catalyst, said surfactant interacting additive and/or, optionally, further additives, respectively, in concentrated form in their polymer matrices, e.g. polyolefin matrices.

Alternatively, one or more of the "at least one" silanol condensation catalyst, the surfactant interacting additive and the, optional, further additives. need not to be added as comprised in masterbatches but may instead be added, e.g. in liquid form, directly to a system for production of the polymer composition of the present invention.

The further, optional, additives may be as already described herein.

The polymer matrix or matrices of the one or more additive masterbatches may suitably be as the polymer matrix of the silanol condensation catalyst as described herein.

Further, the silanol condensation catalyst masterbatch, the additive masterbatch or masterbatches comprise said "at least one" catalyst, said surfactant interacting additive and, optionally, further additives, in concentrated form. The wording "concentrated form" means herein that said "at least one" catalyst, said surfactant interacting additive and the optional further additives have higher concentration in said masterbatches as compared with their concentration in the final crosslinkable polymer composition.

In further embodiments of the present invention a silanol condensation catalyst masterbatch or an additive masterbatch, as described herein, may, for example, comprise the "at least one" silanol condensation catalyst in an amount of, for example, 0.7 to 8% by weight, 0.7 to 6% by, 1 to 8% by weight or 1 to 6% by weight.

Further in accordance with the present invention, when a silanol condensation catalyst masterbatch or an additive masterbatch, as described herein, is compounded with said polymer composition comprising said crosslinkable polyolefin, the silanol condensation catalyst masterbatch or the additive masterbatch may be present in an amount of 1 to 10 wt %, for example, 2 to 8 wt %.

In an even further embodiment of the present invention, the surfactant interacting additive may be comprised in, or, alternatively, comprises an additive masterbatch which is a colour master batch.

In a further embodiment of the present invention, the surfactant interacting additive comprises $TiO_2$, $CaCO_3$ and/or carbon black, e.g. a UV black.

In still a further embodiment of the present invention, the surfactant interacting additive comprises hindered-amine light stabilizers (HALS).

The present invention do also relate to a process for producing an article, wherein said process comprises use, for example extrusion, of a polymer composition as described herein. Said extrusion may be performed at a temperature of, for example, 140 to 280° C.

In a further embodiment of the present invention a polymer composition is disclosed, wherein the polymer composition comprises a crosslinked polyolefin, wherein the crosslinked polyolefin is produced by crosslinking the crosslinkable polyolefin comprised in the polymer composition as described herein.

In an even further embodiment of the present invention a polymer composition is disclosed, wherein the polymer composition comprises a crosslinked polyolefin, as described herein, and wherein the polymer composition has a hot set elongation of less than 175% when measured according to method EN60811-2-1:1999.

In even further embodiments of the present invention a polymer composition is disclosed, wherein the polymer composition comprises a crosslinked polyolefin, as described herein, and wherein the polymer composition has a hot set elongation of less than 150, 130 or 100%

A further embodiment of the invention relates to an article, for example, a coating, a wire or a cable, which article comprises the polymer composition as described herein.

Still a further embodiment of the present invention relates to use of the polymer composition as described herein.

The following examples illustrate, but intend not to limit, the present invention.

EXAMPLES

1. Methods
a. Melt Flow Rate

The melt flow rate (MFR) is determined according to ISO 1133 and is indicated in g/10 min. The MFR for ethylene polymers is determined at 190° C. and with a 2.16 kg load ($MFR_2$).

b. Hot Set Elongation

The crosslinking of the polymer composition was determined according to IEC-60811-2-1 (hot set method and permanent set) by measuring the thermal deformation at 200° C. and a load of 0.2 MPa after various times of crosslinking at 23° C. and 50% R.H.

2. Materials

Base resin, which is comprised in the polymer composition, is in the examples herein an ethylene vinylsilane copolymer Visico LE4423™, i.e. a crosslinkable polyolefin with hydrolysable silane groups, supplied by Borealis having a density of 923 kg/m³ and an $MFR_{2.16}$ of 1.0 g/10 min Catalyst masterbatches are composed as described Table 1 below. DBSA (dodecylbenzenesulfonic acid), i.e. Ufacid K from Unger Fabrikker. Nacure® CD-2180, i.e. a highly hydrophobic mixture of $C_{12}$-alkylated naphthyl sulfonic acids (i.e. silanol condensation catalysts selected from the compound of formula I, as described herein), from King Industries, having an active content of 80%. Catalyst masterbatches were prepared having an equimolar amount of sulfonic acid groups. Amounts are given in weight percentages of the total catalyst masterbatch.

The catalyst carrier is BAR717, i.e. ethylene butylacrylate copolymer, which is supplied by Special Polymers Antwerp. The BAR717 has a butyl acrylate content of 17 weight % and an $MRF_{2.16}$ of 7.5 g/10 min.

The stabiliser is Lowinox CPL, a phenolic stabilizer from Chemtura, and the drying agent is Dynasylan 9116, HDTMS, hexadecyltrimethoxysilane produced by Evonic. The surfactant interacting additive used in the tests is 2000-WT-50, a white colour masterbatch supplied by PolyOne. 2000-WT-50 contains by weight: 30-60% $TiO_2$, 10-30% $CaCO_3$, 1-5% Amorphous Silica, 1-5% $Al_2O_3$, 0.1-1% Quartz.

TABLE 1

|  | Catalyst masterbatch A | Catalyst masterbatch B |
|---|---|---|
| BAR717 (catalyst carrier) | 86.1 | 83.3 |
| DBSA | 3.5 |  |
| Nacure CD-2180 |  | 6.3 |
| Stabilizers | 6.4 | 6.4 |
| Drying agent | 3 | 3 |

3. Sample Preparation

Catalyst masterbatches may be prepared by mixing the components in a Banbury kneader at 130° C. for 8 minutes. The compounds may afterwards be pelletized on a Buss kneader. Tapes of 1.8 mm may be extruded using a Collin tape extruder operating at 50 rpm with a temperature profile of 150/160/170 degrees Celsius of the extrusion zones.

TABLE 2

| Composition of the tapes. | | | | |
|---|---|---|---|---|
|  | Comparative Example 1 | Comparative Example 2 | Comparative Example 3 | Innovative Example 1 |
| LE4423 | 95 | 95 | 94 | 94 |
| Catalyst MB A | 5 |  | 5 |  |
| Catalyst MB B |  | 5 |  | 5 |
| 2000-WT-50 |  |  | 1 | 1 |

The tapes were treated in 90° C. water bath or ambient conditions (23° C., 50% RH) and hot-set elongation were measured at 200° C. after 15 minutes applying a load of 0.2 MPa. Amounts are given in weight percentages of the total composition.

The results from the hot-set elongation tests are given in Table 3. The standard requirements for LV cable insulation are a hot-set elongation of <175% as given in e.g. IEC60502-1 Ed. 2 and HD603 A1.

TABLE 3

| Hot-set elongation. | | | | |
|---|---|---|---|---|
| Hot-set elongation after: | Comparative Example 1 | Comparative Example 2 | Comparative Example 3 | Innovative Example 1 |
| 4 h in water bath | <100% | <100% | Fail | <150% |
| 8 h in water bath | <100% | <100% | Fail | <150% |
| 24 h in water bath | <60% | <60% | Fail | <150% |
| 14 days in ambient condition | <100% | <100% | <150% | <150% |
| 21 days in ambient condition | <100% | <100% | <150% | <150% |
| Total result | Pass | Pass | Fail | Pass |

The comparative examples 1 and 2, without colour masterbatch meet all hot set and crosslinking requirements. The comparative example 3 comprising a highly hydrophilic alkyl benzene sulphonic acid catalyst with, comparably, fewer carbons and a $TiO_2$ colour masterbatch the sample crosslinks in ambient condition but not in hot water bath (the sample 3 broke within one minute in the hot set oven). The innovative example 1, comprising a highly hydrophobic mixture of alkylated naphthyl sulfonic acids with, comparably, more carbons and a $TiO_2$ colour masterbatch the sample meet all hot set requirements both when crosslinking in Ambient condition and in the hot water bath.

The invention claimed is:

1. A polymer composition comprising a surfactant interacting additive, which comprises solid substances with polar surface groups selected from the group consisting of $TiO_2$, $CaCO_3$, huntite, mica, kaolin, aluminium hydroxide, magnesium dihydroxide, $SiO_2$, and a combination thereof, in an amount of from 0.01 to 5% by weight, wherein the polymer composition further comprises at least one silanol condensation catalyst, wherein each catalyst is selected from:

i) a compound of formula I $$ArSO_3H \qquad (I)$$

or a precursor thereof, wherein
Ar is an 1 to 4 alkyl groups substituted aryl, wherein the aryl is phenyl or naphthyl, and wherein each alkyl group, independently, is a linear or branched alkyl with 10 to 30 carbons, wherein the total number of carbons in the alkyl groups is in the range of 20 to 80 carbons;
ii) a derivative of i) selected from the group consisting of an anhydride, an ester, an acetylate, an epoxy blocked ester and an amine salt thereof which is hydrolysable to the corresponding compound of formula I; and
iii) a metal salt of i) wherein the metal ion is selected from the group consisting of copper, aluminum, tin and zinc.

2. A polymer composition according to claim 1, wherein the polymer composition is a silanol condensation catalyst masterbatch which further comprises a polymer matrix.

3. A polymer composition according to claim 1, wherein the polymer composition further comprises a crosslinkable polyolefin with hydrolysable silane groups.

4. A polymer composition according to claim 1, wherein Ar, of the compound of formula I, is naphthyl.

5. A polymer composition according to claim 1, wherein each catalyst is selected from
a) $C_{12}$-alkylated naphthyl sulfonic acids;
b) a derivative of a) selected from the group consisting of an anhydride, an ester, an acetylate, an epoxy blocked ester and an amine salt thereof which is hydrolysable to the corresponding compound of a); and/or
c) a metal salt of a) wherein the metal ion is selected from the group consisting of copper, aluminum, tin and zinc.

6. A polymer composition according to claim 1, wherein the polymer composition comprises the "at least one" silanol condensation catalyst in an amount of 0.0001 to 8 wt %.

7. A polymer composition according to claim 1, wherein the surfactant interacting additive comprises a colour masterbatch.

8. A polymer composition according to claim 1, wherein the surfactant interacting additive comprises $TiO_2$ and/or $CaCO_3$.

9. A polymer composition according to claim 1, wherein the surfactant interacting additive comprises hindered-amine light stabilizers (HALS).

10. A polymer composition according to claim 3, wherein the crosslinkable polyolefin with hydrolysable silane groups comprises a polyethylene with hydrolysable silane groups.

11. A polymer composition according to claim 3, wherein the crosslinkable polyolefin with hydrolysable silane groups comprises 0.001 to 15% by weight of silane compound.

12. A polymer composition according to claim 3, which comprises a crosslinked polyolefin, wherein the crosslinked polyolefin is produced by crosslinking the crosslinkable polyolefin comprised in the polymer composition according to claim 3.

13. A polymer composition according to claim 12, wherein the polymer composition has a hot set elongation of less than 175% when measured according to method EN60811-2-1:1999.

14. An article comprising the polymer composition, according to claim 1.

15. A process for producing an article, wherein said process comprises use of a polymer composition according to claim 1.

* * * * *